W. WARE.
ROLLER.
APPLICATION FILED JAN. 31, 1914.

1,110,360.

Patented Sept. 15, 1914.

Witnesses:

Inventor:
Walter Ware.
By Cheever & Cox
Attys.

UNITED STATES PATENT OFFICE.

WALTER WARE, OF CHICAGO, ILLINOIS.

ROLLER.

1,110,360.	Specification of Letters Patent.	Patented Sept. 15, 1914.

Application filed January 31, 1914. Serial No. 815,604.

*To all whom it may concern:*

Be it known that I, WALTER WARE, a citizen of the United States, residing at Chicago, in the county of Cook and State of Illinois, have invented a certain new and useful Improvement in Rollers, of which the following is a specification.

My invention relates to rollers for use on roller skates or as casters and for similar purposes; and the object of the invention is to provide a metallic roller possessing extreme simplicity coupled with great durability. It is well known by those skilled in such matters that much thought has been expended in the design and manufacture of devices of this nature and that seemingly slight changes in theory of construction produce important changes in durability, ease and accuracy of manufacture, number of different parts which need be kept on hand by the manufacturer and number of steps or processes required to produce said parts. My purpose is to provide a roller in which the number of differing parts is reduced to a minimum, the aggregate number of parts reduced to a minimum, and the configuration of the parts rendered as simple and durable as possible.

I obtain my objects by the construction illustrated in the accompanying drawings in which—

Figure 1:
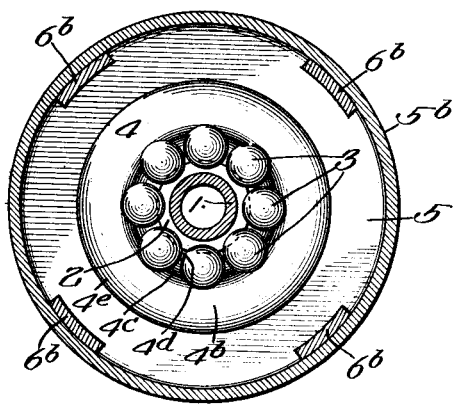
Figure 2:
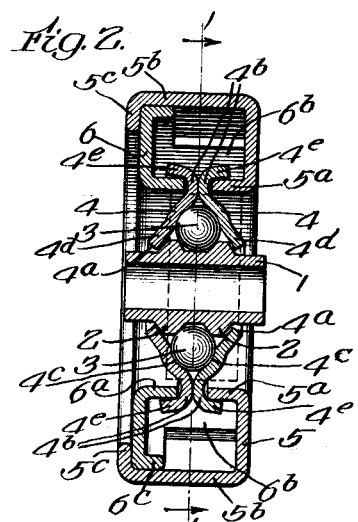
Figure 3:
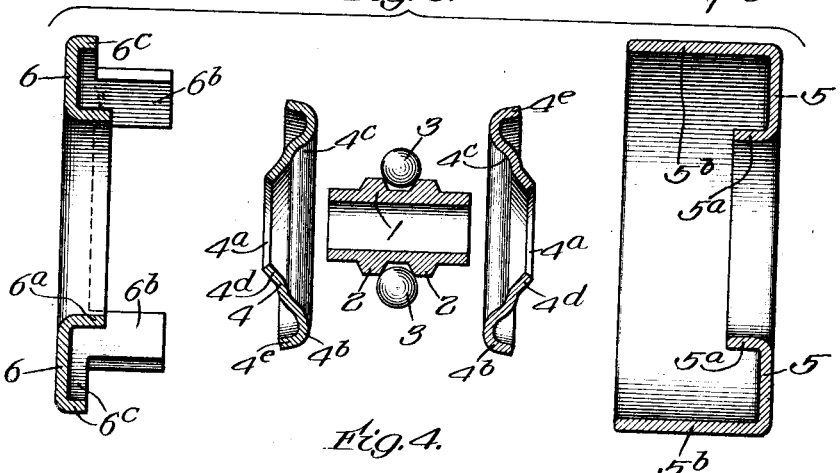
Figure 4:
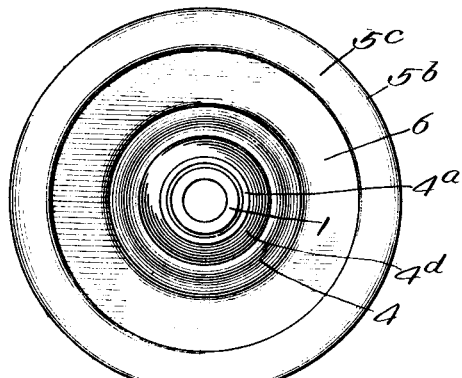

Figure 1 is a section of the roller on the line 1—1, Fig. 2. Fig. 2 is an axial section of the roller. Fig. 3 shows the parts of the roller spaced apart but arranged to show their various relationships to each other. Fig. 4 is a side view of the roller looking toward the right in Fig. 2.

Similar numerals refer to similar parts in the different views.

Shaft 1, which in the form shown is hollow, has two external annular parallel ridges 2, 2 which, in the preferred construction, are conical on both sides, the groove between them forming a raceway for the balls 3 and the outer conical surfaces forming stops or bearing surfaces (under certain conditions) for the race plates 4, 4. Said race plates, which are shown separately in Fig. 3, are duplicates of each other. In general form they are annular, having central apertures 4$^a$ and annular convex surfaces 4$^b$, 4$^b$ designed to contact each other when assembled, to hold said plates at the proper distance apart to form a cup or external raceway for the balls. They have annular channels 4$^c$ in which the balls run in the usual manner. Adjacent to the central apertures are wings 4$^d$ which, when the parts are assembled, clear the external conical surfaces of the ridges 2 but are capable of bearing upon said surfaces in case of excessive wear. Said plates have flanges 4$^e$ formed at their outer periphery, which extend away from each other and interfit with flanges 5$^a$ and 6$^a$ formed respectively upon the body portion 5 and side plate 6. The body portion has a tread 5$^b$ and a flange 5$^c$ extending inwardly from one edge of the tread for retaining the side plate in position. The side plate is prevented, preferably by the legs 6$^b$, from approaching too closely to the opposite side wall of the body portion 5, the manner of coöperation being clearly illustrated in Fig. 2.

Except for the center shaft and balls, I accomplish the above described configurations by punch and die work in distinction to spinning. In assembling a roller the parts appear first in the condition shown in Fig. 3. After they are properly brought together with the shaft, balls, race plates and side plate in position in the body portion, I produce a flange 5$^c$ at the edge of the tread (see Fig. 2) for backing up and retaining the side plate 6. After this, the elements of the device cannot be taken apart, but on the contrary are securely held in assembled position. The coöperating flanges 5$^a$, 6$^a$ hold the race plates 4 in contact with each other and cause them to form a raceway for the balls. The flange 5$^a$ makes a drive fit or wedge fit with the flange 4$^e$ of the adjacent race plate while the flange 6$^a$ coöperates in a similar manner with the flange 4$^e$ adjacent to it. The flanges are protected against excessive pressure, however, when the parts are forced together, by the presence of the legs 6$^b$, which contact the opposite side wall of the body portion 5. Thus a wedging action is obtained and yet overstrain in the metal is avoided. The flanges 5$^a$ and 6$^a$ have the same diameter and hence securely hold the race plates in exact alinement with each other; this is of importance for otherwise the balls would jam and render the roller inoperative.

In the best construction a flange 6$^b$ is formed at the periphery of the side plate 6, and the legs 6$^b$ extend therefrom instead of directly from the plate itself. This not only makes a more practical punching but gives additional strength to the side plate and affords ample surface for supporting the tread 5ᵇ of the body portion of the roller.

From the foregoing description, taken in connection with the drawings, it will be seen that in my roller the full thickness of the metal is rendered available at all portions of the device. I do not rely on the partial thicknesses at any point as has been the practice in some of the devices heretofore produced. This is of great practical importance in lending durability, for the wear upon devices of this class is very great—in fact surprisingly great when the roller is used for skating on hard rough surfaces such as cement sidewalks. At best, the life of the rollers is short under such circumstances, the tires wearing out very fast; and to employ full thickness of metal at all points as I am able to do is a very important factor in adding to the life of the device. Furthermore, it will be noted that in my roller when the tread fails by reason of wear, the roller will not collapse without warning and give the user a fall; for so long as any substantial part of the flange 5ᶜ remains intact with the body portion the side plate 6 will remain in position and its flange 6ᵃ will afford a temporary tread for the roller. In addition to this the elements will not immediately come apart from each other in view of the wedging fit to which the race plates 4 and their coöperating flanges are subjected during assemblage.

I desire to direct attention to another important feature of my construction, to wit, the fact that the two race plates 4 are exact duplicates of each other. This reduces the number of different shapes entering into the construction of the device, the result being that fewer punches and dies are required and the device, from the manufacturer's standpoint, is much simplified.

Another advantage in my construction is that if the balls should wear excessively or should actually fail, the central shaft will be retained approximately in position by the wings 4ᵈ of the race plates which will engage the adjacent conical surfaces on the ridges 2. Consequently the user will have plenty of warning in case the device is out of repair.

Having thus described my invention, what I claim as new, and desire to secure by Letters Patent, is:—

1. A roller comprising a central shaft having an annular raceway, balls in said raceway, twin race plates, one on each side of the balls, said race plates having outwardly facing flanges at their periphery, a body portion having an inwardly faced flange engaging the outwardly facing flange of the adjacent raceway, a side plate having an inwardly facing flange engaging the outwardly facing flange on the remaining race plate, said body portion having a tread and engaging said side plate to hold it against movement in one direction, and spacing means for holding said side plate against movement in the opposite direction.

2. A roller comprising a central shaft having an annular raceway, balls in said raceway, twin race plates, one on each side of the balls, said race plates having flaring outwardly facing flanges at their periphery, a body portion having an inwardly facing flange making a wedge fit with the outwardly facing flange of the adjacent race plate, a side plate having an inwardly facing flange making a wedge fit with the outwardly facing flange of the remaining race plate, a leg on said side plate engaging the opposite side of said body portion to limit the wedging action upon said race plates, and means on said body portion for retaining the side plate.

3. A roller comprising a central shaft having an external raceway, balls in said raceway, twin race plates, one on each side of the balls, and two elements having approximately cylindrical flanges concentric with the shaft and engaging said race plates on opposite sides thereof, one of said two elements constituting a body portion having a side wall and a tread, and the other constituting a side plate, the full thickness of said body portion being rimmed over the periphery of the side plate for retaining the side plate and spacing means for holding the side plate against inward movement.

4. In a roller, the combination of a pair of twin race plates having concave surfaces facing toward each other to form a raceway, balls in said raceway, a central shaft passing through said plates concentrically thereto, said plates having flanges at their periphery facing outwardly, a body portion having a tread and a substantially cylindrical inwardly facing flange engaging the outwardly facing flange upon one of said race plates, a side plate having an inwardly facing flange engaging the outwardly facing flange on the other of said race plates, said side plate fitting into the tread of the body portion and being held thereby against movement in one direction and spacing means for holding said side plate against movement in the opposite direction, said body portion and side plate thereby retaining the race plates in alinement with each other.

5. In a roller, the combination of a central shaft having an external raceway, balls in said raceway, twin race plates, one on each side of the balls, and two elements engaging said race plates on opposite sides thereof to hold them together, one of said two elements constituting a body portion provided with a tread and the other constituting a side plate located within said tread, said body portion having a flange engaging the outside of the side plate for retaining it, and said side plate having spacing means for holding it in engagement with said flange, said race plates, body portion and side plate all being of sheet metal and each having full thickness of metal throughout its entire configuration.

In witness whereof I have hereunto subscribed my name in the presence of two witnesses.

WALTER WARE.

Witnesses:
HOWARD M. COX,
KATHRYN S. READY.